US012171226B2

(12) United States Patent
Choe et al.

(10) Patent No.: US 12,171,226 B2
(45) Date of Patent: *Dec. 24, 2024

(54) DEVELOPMENT OF PHEROMONE ASSISTED TECHNIQUES TO IMPROVE EFFICACY OF INSECTICIDE SPRAYS TARGETING URBAN PEST ANT SPECIES

(71) Applicant: The Regents of the University of California, Oakland, CA (US)

(72) Inventors: Dong-Hwan Choe, Riverside, CA (US); Kathleen Campbell, Riverside, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/426,899

(22) PCT Filed: Sep. 9, 2013

(86) PCT No.: PCT/US2013/058720
§ 371 (c)(1),
(2) Date: Mar. 9, 2015

(87) PCT Pub. No.: WO2014/039950
PCT Pub. Date: Mar. 14, 2014

(65) Prior Publication Data
US 2015/0237853 A1  Aug. 27, 2015

Related U.S. Application Data

(60) Provisional application No. 61/700,088, filed on Sep. 12, 2012, provisional application No. 61/698,053, filed on Sep. 7, 2012.

(51) Int. Cl.
*A01N 25/12* (2006.01)
*A01N 25/16* (2006.01)
*A01N 35/02* (2006.01)
*A01N 47/02* (2006.01)

(52) U.S. Cl.
CPC .............. *A01N 35/02* (2013.01); *A01N 25/12* (2013.01); *A01N 25/16* (2013.01); *A01N 47/02* (2013.01)

(58) Field of Classification Search
CPC ........ A01N 65/00; A01N 61/00; A01N 53/00; A01N 25/006; A01N 51/00; A01N 25/00; A01N 25/12; A01N 25/16; A01N 25/06; A01N 25/02
See application file for complete search history.

(56) References Cited

U.S. PATENT DOCUMENTS

| | | | | |
|---|---|---|---|---|
| 4,073,882 A * | 2/1978 | Ritter | ................... | C07D 471/04 424/84 |
| 5,602,177 A * | 2/1997 | Heinrich | ................ | A01N 25/00 514/521 |
| 5,953,854 A * | 9/1999 | Hyatt | ................... | A01M 1/026 43/131 |
| 2002/0146394 A1* | 10/2002 | Stamets | ................. | A01N 63/04 424/93.5 |
| 2006/0228388 A1* | 10/2006 | Fitzgerald | .............. | A01N 45/00 424/405 |
| 2007/0079545 A1* | 4/2007 | McManus | ............ | A01N 25/006 43/131 |
| 2008/0027046 A1* | 1/2008 | Annan | .................... | A01N 43/56 514/229.2 |
| 2009/0263511 A1* | 10/2009 | Shah | ...................... | A01N 65/00 424/725 |
| 2010/0056534 A1 | 3/2010 | Nugent et al. | | |
| 2010/0140368 A1* | 6/2010 | de Lame | ................ | A01N 25/16 239/1 |
| 2011/0236451 A1* | 9/2011 | Taranta | .................. | A01N 43/56 424/405 |

FOREIGN PATENT DOCUMENTS

| | | |
|---|---|---|
| KR | 20090084107 A | 8/2009 |
| KR | 20110038943 A | 4/2011 |
| RU | 2384065 C2 | 3/2010 |
| WO | WO 2010/027779 A2 | 3/2010 |

OTHER PUBLICATIONS

Key, "Specificity of Laboratory Trail Following By the Argentine Ant, Iridomyrmex humilis (Mayr), TO (Z)-9-Hexadecenal, Analogs, and Gaster Extract", Journal of Cheimcal Ecology, vol. 8, No. 7, 1982.*
Sunamura, "Combined use of synthetic trail pheromone and insecticidal bait provides effective control of an invasive ant", Pest Management Science, 67, 1230-1236, published online Apr. 21, 2011.*
Choe, "Pheromone-Assisted Techniques to Improve the Efficacy of Insecticide Sprays Against Linepithema humile (Hymenoptera: Formicidae)", Journal of Economic Entomology, 107(1):319-325. 2014.*
Hooper-Bui, "Oral Toxicity of Abamectin, Boric Acid, Fipronil, and Hydramethylnon to Laboratory Colonies of Argentine Ants (Hymenoptera: Formicidae)", Journal of Economic Entomology, 93(3):858-864, Jun. 2000.*
International Search Report (PCT/ISA/210) mailed on Dec. 12, 2013, by the Russian Patent Office as the International Searching Authority for International Application No. PCT/US2013/058720.
Written Opinion (PCT/ISA/237) mailed on Dec. 12, 2013, by the Russian Patent Office as the International Searching Authority for International Application No. PCT/US2013/058720.

(Continued)

*Primary Examiner* — Nicole P Babson
*Assistant Examiner* — John P Nguyen
(74) *Attorney, Agent, or Firm* — Buchanan Ingersoll & Rooney PC

(57) ABSTRACT

A method and system of improving efficacy of an insecticide, which includes attracting a target species to a treatment area using a synthetic trail pheromone, and exposing the target species to an insecticide at the treatment area.

14 Claims, 2 Drawing Sheets

(56) References Cited

OTHER PUBLICATIONS

Cao, T., et al., "Ants use Pheromone markings in Emigrations to move closer to Food-Rich areas", Insectes Sociaux, vol. 59, Issue 1, pp. 87-92, Feb. 2012.
Delgado-Moreo., L. et al., "Occurrence and Toxicity of three classes of insecticides in Water and Sediment in two Southern California Coastal Watersheds", Journal of Agricultural and Food Chemistry, vol. 59, Issue 17, pp. 9448-9456; 2011.
Field, H., et al., "A survey of structural ant pests in the southwestern USA (Hymenoptera: Formicidae)", Sociobiology, vol. 49, Issue 2, pp. 1-14, 2007.
Greenberg, L., et al., "Impact of Ant Control Technologies on Insecticide Runoff and Efficacy", Pest Management Science, vol. 66, Issue 9, pp. 980-987, 2010.
Greenberg, L., et al., "Argentine Ant (Hymenoptera: Formicidae) trail Pheromone enhances consumption of liquid Sucrose solution", Journal of Economic Entomology, vol. 93, Issue1, pp. 119-122, 2000.
Hölldobler, B., et al., "The Multiple Recruitment Systems of the African Weaver Ant Oecophylla longinoda (Latreille)(Hymenoptera: Formicidae)", Behavioral Ecology and Sociobiology, vol. 3, Issue 1, pp. 19-60, 1978.
Klotz, J., et al., "Directed Sprays and Liquid Baits to Manage Ants in Vineyards and Citrus Groves" Journal of Agricultural and Urban Entomology, Issue 20, vol. 1, pp. 31-40, Jan. 2003.
Knight, R., et al., "The Urban Ants of California with Distribution Notes of Imported Species", Southwestern Entomologist, vol. 15, Issue 2, pp. 167-178, Jun. 1990.
Lao, W., et al., "Analysis, Occurrence, and Toxic Potential of Pyrethroids, and Fipronil in Sediments from an Urban Estuary", Environmental Toxicology and Chemistry vol. 29, Issue 4, pp. 843-851, 2010.
Nishisue, K., et al., "Long-term field trial to control the invasive Argentine Ant (Hymenoptera: Formicidae) with Synthetic Trail Pheromone", Journal of Economic Entomology, vol. 103, Issue 5, pp. 1784-1789, Oct. 2010.
Rust, M., et al., "Pest Management of Argentine Ants (Hymenoptera: Formicidae) 1" Journal of Entomological Science, vol. 38, Issue 2, pp. 159-169, 2003.
Silverman, J., et al., "The Argentine Ant: Challenges in Managing an invasive Unicolonial Pest" Annual Review of Entomology, vol. 53, pp. 231-252, 2008.
Suckling, D. M., et al., "Pheromone Disruption of Argentine Ant Trail Integrity" Journal of Chemical Ecology, vol. 34, Issue 12, pp. 1602-1609, 2008.
Suckling, D. M., et al., "Trail Pheromone Disruption of Argentine Ant Trail Formation and Foraging", Journal of Chemical Ecology, vol. 36, Issue 1, pp. 122-128, 2010.
Tanaka, Y., et al., "Trail-following Disruption in the invasive Argentine Ant with a Synthetic Trail Pheromone Component (Z)-9-hexadecenal", Sociobiology, vol. 54, Issue1, p. 139, 2009.
Weston, D., et al., "Aquatic Toxicity due to Residential Use of Pyrethroid Insecticides", Environmental Science & Technology, vol. 39, Issue 24, pp. 9778-9784, 2005.
Weston, D., et al., "Residential Runoff as a Source of Pyrethroid Pesticides to Urban Creeks" Environmental Pollution, vol. 157, Issue 1, pp. 287-294, 2009.
Wilkins, K., et al., "Recruitment Behaviour in the Ponerine Ant, *Plectroctena mandibularis* F. Smith (Hymenoptera: Formicidae)", African Entomology vol. 14, Issue 2, pp. 367-372, 2006.
Witte, V., et al., "Complex Chemical Communication in the crazy Ant *Paratrechina longicornis* Latreille (Hymenoptera: Formicidae)", Chemoecology, vol. 17, Issue 1, pp. 57-62, 2007.
Sunamura, E., et al. "Combined Use of a Synthetic trail Pheromone and Insecticidal Bait provides effective control of an Invasive Ant" Pest Management Science, vol. 67, Issue 10, pp. 1230-1236, published online Apr. 21, 2011.
Choe et al., "Pheromone-Assisted Techniques to Improve the Efficacy of Insecticide Sprays Agains Linepithema humile (Hymenoptera: Formicidae)", Journal of Economic Entomology, (Feb. 2014), vol. 107, No. 1, pp. 319-325.
Nishisue et al., "Long-Term Field Trial to Control the Invasive Argentine Ant (Hymenoptera: Formicidae) With Synthetic Trail Pheromone", Journal of Economic Entomology, (Oct. 2010), vol. 103, Issue 5, pp. 1784-1789.
Suckling et al., "Argentine Ant Trail Pheromone Disruption is Mediated by Trail Concentration", Journal of Chemical Ecology, (Oct. 2011), vol. 37, No. 10, pp. 1143-1149.
Suckling et al., "Pheromone Disruption of Argentine Ant Trail Integrity", Journal of Chemical Ecology, (Dec. 2008), vol. 34, No. 12, pp. 1602-1609.
Suckling et al., "Trail Pheromone Disruption of Argentine Ant Trail Formation and Foraging", Journal of Chemical Ecology, (Jan. 2010), vol. 36, No. 1, pp. 122-128.
Suiter et al., "Alternative Methods of Ant (Hymenoptera: Formicidae) Control with Emphasis on the Argentine Ant, *Linepithema humile*", Insects, (May 24, 2021), vol. 12, No. 6, 487, pp. 1-13.
Sunamura, "Application of Trail Pheromones to Management of Pest Ants", Chemical Ecology of Insects, 1st Edition, (month unknown 2018), Chapter 7, pp. 159-169.
Sunamura et al., "Combined use of a Synthetic Trail Pheromone and Insecticidal Bait Provides Effective Control of an Invasive Ant", Pest Management Science, (Oct. 2011), vol. 67, No. 10, pp. 1230-1236.
Tanaka et al., "Trail-following Disruption in the Invasive Argentine Ant with a Synthetic Trail Pheromone Component (Z)-9-hexadecenal", Sociobiology, (Jan. 2009), vol. 54, No. 1, pp. 139-152.
Rust et al., "Barrier Sprays to Control Argentine Ants (Hymenoptera: Formicidae)", Journal of Economic Entomology, 1996, vol. 89, No. 1, pp. 134-137.

* cited by examiner

DEVELOPMENT OF PHEROMONE ASSISTED TECHNIQUES TO IMPROVE EFFICACY OF INSECTICIDE SPRAYS TARGETING URBAN PEST ANT SPECIES

CROSS-REFERENCE TO RELATED APPLICATIONS

This application claims priority under 35 U.S.C. § 371 to PCT/US2013/058720 filed as an International Application on Sep. 9, 2013, designating the U.S. and claims the benefit of U.S. Provisional Patent Application Ser. No. 61/698,053, filed Sep. 7, 2012, and U.S. Provisional Patent Application Ser. No. 61/700,088, filed Sep. 12, 2012, the entire contents of each which are hereby incorporated herein by reference.

TECHNICAL FIELD

The present invention pertains to the development of pheromone assisted techniques to improve efficacy of insecticide sprays targeting urban pest ant species, and more particularly, to improve the efficacy and target specificity of existing insecticide spray methods for pestiferous ants by exploiting the target species' innate trail following behavior, while simultaneously providing environmentally and economically favorable IPM strategies.

BACKGROUND

Ants rank as one of the most important pest complexes in the structural pest control industry, with an estimated $1.7 billion spent annually for their control by pest management professionals (PMPs) in the United States. Commercial pest control companies in California report that 65% to 80% of their pest control services concern pest ants. A survey by one pest management company reported that 36% of all customer calls concerned ant control, equaling the combined total for the next three pests (cockroaches, spiders, and bees). A telephone survey in northern California indicated that ants are the most common pest group encountered by homeowners and PMPs.

Control strategies for urban pest ants have primarily focused on the application of barrier sprays, granules, and baits. Even with recent advances in bait technologies, residual insecticide barriers are still widely used by PMPs to control urban pest ants. In particular, various pyrethroids such as bifenthrin, cyfluthrin, cypermethrin, permethrin, and fipronil (phenylpyrazole) are among the most common insecticides used by homeowners and PMPs to control ants in urban areas. For instance, the amount of permethrin used for structures and landscape maintenance, as reported by licensed applicators, increased from 70,185 kg (active ingredient) in 1997 to 119,508 kg in 2007. Over the same time period, bifenthrin use increased from 40 to 22,025 kg, and cypermethrin use increased from 41,188 kg to 88,272 kg. Similarly, after its registration in 1996 in California, the use of fipronil reached 29,374 kg per year in 2007. In fact, fipronil (Termidor) has become one of the primary insecticides applied around structures for pest insects.

Consequently, pyrethroids, fipronil, and their toxic degradation products are appearing in urban waterways and aquatic sediments. For example, in California, bifenthrin was identified as the primary causative agent of toxicity to an indicator species, the amphipod *Hyalella azteca*, with additional toxicity from cyfluthrin and cypermethrin. *Hyalella azteca* is a standard, lower food-chain organism used to determine the non-target effects of pesticide contaminants. Application of insecticides around structures to control ants and other pests by PMPs and homeowners was recognized as a major source of insecticides in urban waterways. Given the amount of insecticides applied to urban settings for ant control and their impact on urban waterways, development of alternative IPM strategies is critical to decrease the overall amounts of insecticides applied, while still achieving effective control of target ant species.

Insect pheromones have great potential to be exploited in the development of effective IPM programs because of their strong and direct effect on the target pests' behavior, even at extremely low application rates. Furthermore, their species-specificity and absence of non-target toxicity make them ideal tools for developing alternative pest management strategies that minimize non-target impacts. However, the use of insect pheromones for IPM has been typically limited to detection, monitoring, mass trapping, and mating disruption with synthetic sex or aggregation pheromones, with most applications targeting flying insects.

Social insects such as ants, honeybees, and termites use a diverse array of pheromones for organization and coordination of all aspects of their colony development and maintenance, including defense, reproduction, foraging, and nest relocation. In particular, trail pheromones of ants are known to play critical roles in their foraging and nest relocation activities.

Several studies by other researchers have explored the possibility of using synthetic trail pheromones to develop practical management strategies for the Argentine ant, *Linepithema humile*. For example, one study suggested that (Z)-9-hexadecenal, a putative trail pheromone component for Argentine ants, might increase the consumption of sugar-based liquid baits by these ants when it is mixed with the baits. However, this study did not use a toxicant or insecticide with the pheromone compound. Several studies have been conducted in Japan and Hawaii to test whether the application of synthetic (Z)-9-hexadecenal can disrupt trail formation and foraging activity of Argentine ant populations in the field. These experiments found that attempted disruption of foraging with even relatively large quantities of synthetic (Z)-9-hexadecenal had negligible impact on Argentine ant populations when used as a stand-alone treatment, but produced a significant effect when used in conjunction with toxic baits separately applied in the field. Extermination of ants by the insecticidal bait coupled with inhibition of re-infestation by disruption of foraging by the applied (Z)-9-hexadecenal were attributed as possible mechanisms of the combination effect. These studies have only focused on "disrupting" trails by applying a large amount of synthetic pheromone in the environment.

SUMMARY

According to one aspect, a method of improving efficacy of an insecticide, comprises attracting a target species to a treatment area using a synthetic trail pheromone; and exposing the target species to the insecticide at the treatment area.

According to another aspect, a system for improving efficacy of an insecticide, comprises a synthetic trail pheromone for attracting a target species to a treatment area; and an insecticide at the treatment area for treating the target species.

DETAILED DESCRIPTION

Figure 1:
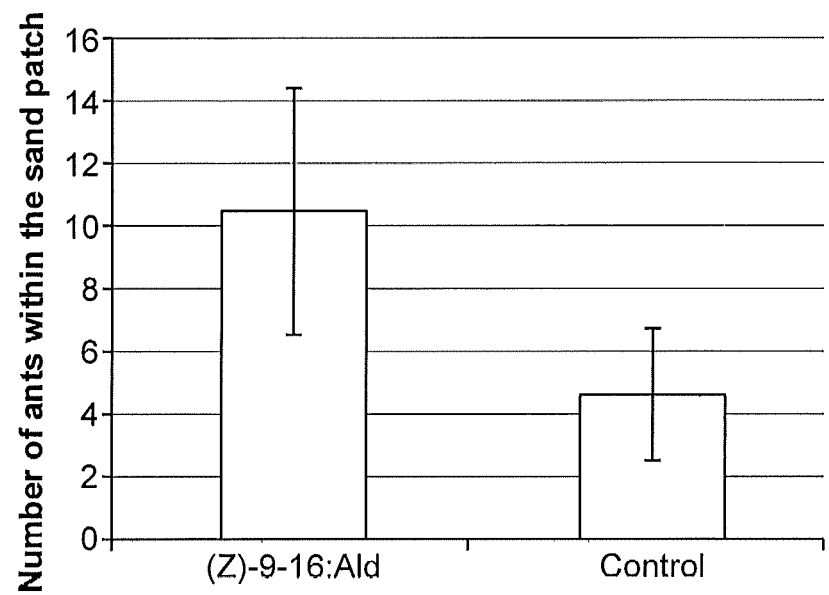
FIG. 1 is a chart showing the effect of (Z)-9-hexadecenal [(Z)-9-16:Ald] to the ants on the existing trail, wherein the height of each bar indicates the mean number of worker ants that are attracted to the treated patch from an existing foraging trail (±SEM).

According to an aspect, a system and method of improving efficacy of insecticide sprays targeting urban pest ant species using a very small amount of pheromone to attract the target ant species to the treated area is disclosed. The response of the insect to the pheromone compound is concentration dependent. According to another aspect, an optimal concentration of the pheromone (extremely low concentration, not detectable to human) can be used with insecticide sprays.

The pheromone assisted technique is designed to maximize the efficacy of insecticide sprays applied in the environment. This new technique can be applied to many kinds of active ingredients and formulations of insecticides. According to a further aspect, the efficacy and target specificity of existing insecticide spray methods can be improved for pestiferous ants by exploiting the target species' innate trail following behavior, and while simultaneously providing environmentally and economically favorable IPM strategies. This "attract-and-expose" approach with trail pheromones provides:

(1) The insecticide/pheromone treated surface (soil, cement, wood) and granules will attract foraging ants from nearby trails and even from the nest, thus maximizing the number of exposed ants. Furthermore, it is not necessary to spray all the trails in the area, because the treated surface would attract ants, subsequently exposing them. The overall effect will be to dramatically reduce the amount of insecticides applied to the environment; and (2) It will also maximize the exposure of individual ants to insecticide spray deposits before any significant degradation of the active ingredient of insecticide on the treated surface occurs as an effect of exposure to sunlight or precipitation. The overall effect will be to maximize the efficacy of the applied insecticides.

According to an aspect, three studies were conducted to empirically support the disclosure. Experiment #1 was conducted in the field to determine whether the synthetic trail pheromone will increase ants' contact with treated surfaces by attracting them from an existing trail (not near to the nest entrance). Experiment #2 was conducted in the field to determine whether the synthetic trail pheromone will increase ants' contact with treated surfaces by attracting them from their nest and nearby trail. Experiment #3 was conducted in the laboratory to determine whether the addition of synthetic trail pheromone in fipronil insecticide spray will improve its efficacy when compared with insecticide only treatment.

Experiment #1 was conducted to observe would synthetic trail pheromone spray deposit attract the ants from an existing trail? The study was conducted in the biological control grove at the University of California, Riverside, in April 2012. The site supports a large population of Argentine ants, primarily because of the absence of chemical insecticide use and the existence of honeydew-producing insects in the citrus trees. Five different trails of Argentine ants were located, which were relatively straight and at least 30-cm long, and originating from different nests. By using these trails as "existing trails," tests were performed to see if the "pheromone assisted technique" would attract ants from the existing trails. For the pheromone treatment, two patches of sand were made, one on each side of the existing trail by evenly spreading 52.5 grams (g) of sand in a square (20 by 20 cm). The distance between two patches was about 5 cm. One patch served as a treatment, and the other one served as a control. For the treatment, 1 mg of the synthetic pheromone compound [(Z)-9-hexadecenal] dissolved in 1 ml of ethyl alcohol was mixed with 500 ml of deionized water. For the control, 1 ml of ethyl alcohol was mixed with 500 ml of deionized water. Both preparations were applied with sprays which deliver about 0.8 ml of liquid at a time in a circular area of 130.9 $cm^2$.

Each sand patch was treated with four sprays (each spray targeting 10 by 10 cm areas on one corner). This resulted in a rate of approximately 12 ng per $cm^2$ for (Z)-9-hexadecenal on the treatment side. Both sand patches were photographed at 2 and 4 min after application of spray preparations. The numbers of ants on the 20 by 20-cm sand patches were counted at 2 and 4 min post-treatment using the photographs. The study was replicated five times by using a different trail for each replicate. The count values from 2 and 4 min post-treatment were averaged for each replication, and the average values were compared between treatment and control patch with a paired T-test (one-sided, Analytical Software 2008). The number on the sand patch treated with pheromone spray was more than two times higher than that of control patch (T=2.52, df=4, P=0.033). The average numbers on the treatment and control sand patches were 10.4±4.0 and 4.6±2.1 (mean±SEM), respectively (see FIG. 1).

Experiment #2 was conducted to observe would synthetic trail pheromone spray deposit attract the ants from a nest entrance and nearby trails? The study was conducted in the biological control grove at the University of California, Riverside, in Apr. 23, 2012. Nest entrances of Argentine ant colonies were located, which had active trails associated with them (one nest entrance per nest). By using the nest entrance and trails associated with the nest entrance, the pheromone assisted technique" was tested to see if it would attract ants from the nest entrance and nearby trails. For the pheromone treatment, two patches were made of sand on both sides of the nest entrance by evenly spreading 52.5 g of sand in a square (20 by 20 cm). The distance between the two patches was about 5 cm. The method and rate of application were identical with those of experiment #1.

Figure 2:
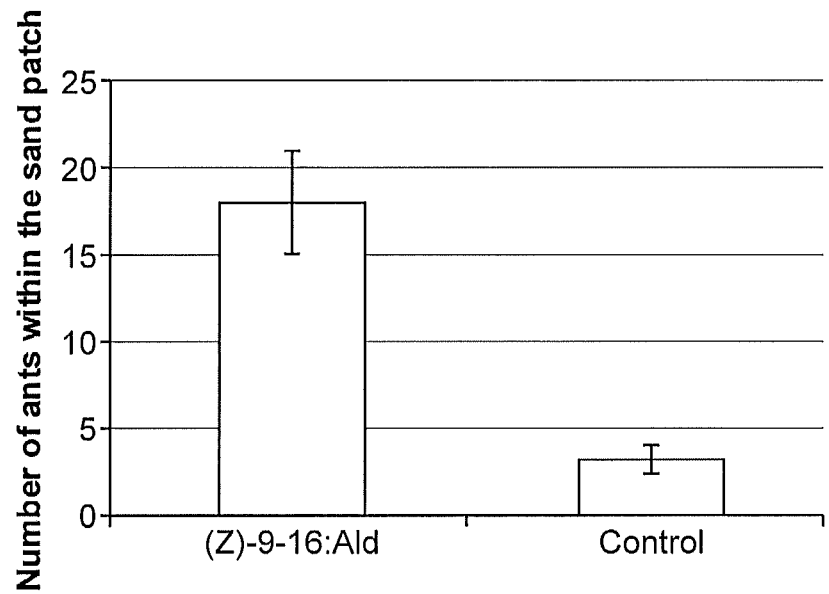
FIG. 2 is a chart showing the effect of (Z)-9-hexadecenal [(Z)-9-16:Ald] to the ants around the nest entrance and nearby trails, wherein the height of each bar indicates the mean number of worker ants that are attracted to the treated patch from the nest entrance and nearby trails (±SEM).

Both sand patches were photographed at 1, 2, and 3 min after application of sprays. The study was replicated ten times by using a different nest entrance for each replicate. The numbers of ants on the 20 by 20-cm sand patches were counted at 1, 2, and 3 minute post-treatment using the photographs. The average values were compared between treatment and control with a paired T-test (one-sided, Analytical Software 2008). The number on the sand patch treated with pheromone spray was more than five times higher than that of control patch (T=4.67, df=9, P<0.001). The average numbers on the treatment and control sand patches were 18.1±3.0 and 3.6±0.7 (mean±SEM), respectively (FIG. 2)

Experiment #3 was conducted to observe would co-application of synthetic trail pheromone improve the efficacy of fipronil insecticide spray applied away from the ant nest? A laboratory study was conducted to determine if the efficacy of an insecticide spray (fipronil) can be improved by adding with a synthetic attractant trail pheromone. Argentine ants were collected from a citrus grove (biological control grove) on the University of California, Riverside, campus. Ant nests were excavated from the ground and transported to a laboratory chamber where they were extracted from the soil. Laboratory stock colonies were maintained in plastic boxes (26.5 by 30 by 10 cm) with the inner sides coated with Teflon™ Fluoropolymer resin, type 30, DuPont Polymers) to prevent ants from escaping. Each colony was provided with two or three artificial nests constructed from plaster-filled petri dishes (9 cm in diameter by 1.5 cm in depth) formed with a 5-cm-diameter by 1-cm-deep cylindrical area in the center of the dish to serve as a nesting space. In addition to continuous access to water in a test tube, the colonies were provisioned with fresh water, 25% (wt:vol) sucrose water, and freshly killed American cockroaches (Periplaneta americana) three times a week.

Argentine ants from the stock laboratory colony boxes were anesthetized with $CO_2$ and placed in an empty plastic box with the sides coated with Teflon (fluoropolymer resin). This pooling process minimized any possible effect of colonial difference. 0.5 g of ants were aspirated out from the box and transferred into a large colony box (86 cm by 42 cm by 14 cm). Aspirating anaesthetized ants resulted in relatively similar-sized colonies with broods as well as workers and reproductives. For example, with six replications, the average total number of ants in a colony was 731±28.1 (mean±SEM, n=6, range 600-782). All of the experimental colonies were provided at least one queen. The large colony box was provided with one artificial nest constructed from plaster-filled petri dishes (9 cm in diameter by 1.5 cm in depth), and a small plastic dish with 25% sugar water applied to a small piece of cotton. The nest was placed near one corner and the sugar water dish was placed in the other corner close to the nest. The entire bottom of the large colony box was covered with a thin sheet of dry sand (400 g, play sand, The Quikrete® International Inc.), providing a more realistic substrate for insecticide treatment.

Three different spray preparations were tested: (a) pheromone+fipronil, (b) fipronil only, and (c) pheromone only. For preparation (a) and (b) 0.5 ml of Termidor® SC (fipronil) (BASF, Research Triangle Park, NC) was mixed with 500 ml of deionized water to make 0.01% (g of active ingredient/ml of aqueous preparation) fipronil preparations, which was 1/6 of the concentration recommend on the label (0.06% for ant control). In preparation of (a), 1 mg of synthetic (Z)-9-hexadecenal dissolved in 1 ml of ethyl alcohol was added. In preparation (b), 1 ml of ethyl alcohol was added. For preparation (c), 1 mg of synthetic (Z)-9-hexadecenal dissolved in 1 ml of ethyl alcohol was added into 500 ml of deionized water. All of the spray preparations were mixed well in the spray bottle before application. Using the hand spray which delivers about 3 ml of liquid at a time, a circular area of 491 $cm^2$ (25 cm diameter) on the opposite side to the nest and sugar water dish were treated with one-spray amount of preparation. The amount of spray preparation per unit area followed the label recommendation for Termidor (i.e., 1.5 gal for 1,000 $ft^2$ or 3 ml for 491 $cm^2$). The application resulted in a rate of approximately 12 ng per $cm^2$ for (Z)-9-hexadecenal on the sand. The treated colonies were maintained for 7 days at 21-25° C. and 34%-45% relative humidity. The dead ants were removed from the colony box and counted daily. The experimental colonies were provided with 25% sucrose water applied to cotton in a plastic dish. This procedure was repeated 5-6 times for each of the treatments.

Figure 3:
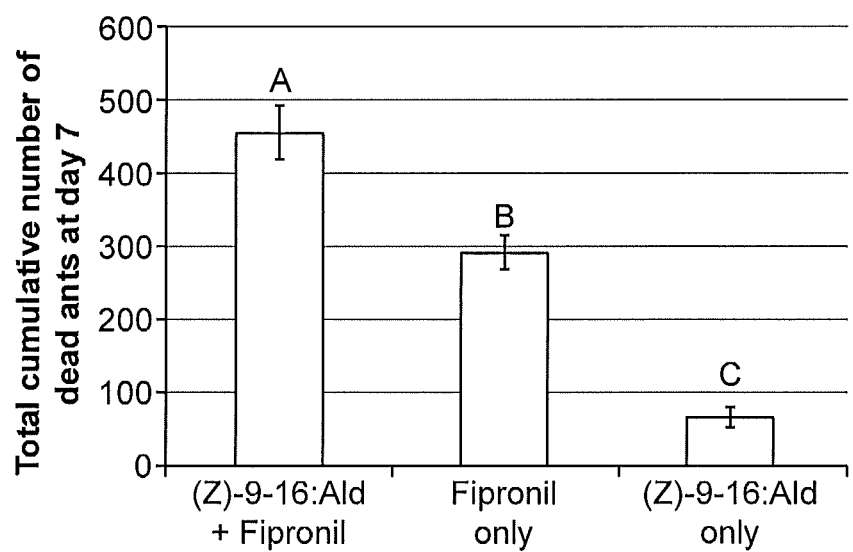
FIG. 3 is a chart showing the effect of (Z)-9-hexadecenal [(Z)-9-16:Ald] addition to an insecticide spray (fipronil), wherein the height of each bar indicates the mean cumulative mortality of ants (workers and reproductives) at day 7 post-treatment(±SEM), and when the fipronil insecticide was sprayed with (Z)-9-hexadecenal, a 57% improved efficacy was obtained than when the fipronil insecticide was sprayed as a stand-alone treatment, and wherein means with different letters are significantly different at the $\alpha=0.05$ level (Tukey HSD all-pairwise comparisons test).

The total numbers of dead ants at day 7 post-treatment were compared between treatments with a one-way ANOVA followed by Tukey HSD all-pairwise comparisons test (Analytical Software 2005). The day 7 mortality levels were significantly different between the three different treatments (F=48.8; df=2,13; P<0.001). Based on a Tukey HSD all-pairwise comparison, the cumulative number of dead ants in the "pheromone+fipronil" treatment was significantly higher than that in the "fipronil only" treatment (458±36.8 vs. 291±27.1, mean±SEM, n=5 and 6, respectively). The cumulative mortality of the "pheromone only" treatment at day 7 was 65.8±11.0 (mean±SEM, n=5), being significantly lower than other two treatments with fipronil insecticide (See FIG. 3).

The concentration of the pheromone in the final insecticide preparation is critical to achieve its desired effect (i.e., attraction to the treated area). In addition, the stability of the pheromone can be negatively affected if it is mixed with the insecticide formulation and then stored for a long time. Because of these reasons, one way of practicing the disclosure will be separately packaging the pheromone and insecticide formulations. For example, the pheromone can be manufactured in the correct concentration in a certain volume of solvent, and can be packaged in a plastic bottle. The users (homeowner or pest control professionals) would then mix the pheromone with the insecticide formulation immediately before spray application.

As disclosed, an insecticide deposit applied to the soil or other substrate will attract the target ant species (in this case, Argentine ant). In addition, the insecticide deposits which have missed their targets (e.g., existing trails or nest entrances) will still have the ability to control insects by attracting them to the insecticide deposit. As a result, the amount of insecticide that is necessary to obtain effective control can be greatly reduced. Pest control professionals can also apply insecticide+pheromone in a targeted manner (e.g., nest entrance or active trails), further reducing the quantity of insecticide applied in the environment.

For example, only 1 mg of pheromone per 500 ml of spray preparation can be used. Considering the recommended amount of spray preparation applied in an average size house is about 4 gallons (15 liters), the total amount of pheromone required for treating a house would be approximately 30 mg. Based on the current price of the synthetic pheromone ($36.76 for 1 g), 30 mg cost approximately $1.00. Because pest control companies or homeowners can reduce the cost by decreasing the active ingredient of insecticide in the spray, this additional pheromone cost is extremely reasonable.

The idea of mixing trail pheromones or other attractant pheromones with insecticide spray can be modified in several ways. First, the pheromone compounds can be used in bait-like strategies. Instead of using food material as attractant for ants (conventional bait), the pheromone can be used as an attractant and the lured insects can be exposed to an insecticide deposit containerized in a bait station. Second, the pheromone compounds can be used with insecticidal granules. Lastly, the pheromone can be used with other insecticide application techniques such as foam application, etc.

For example, these above-disclosed techniques allow the use of active ingredients with low solubility in water and minimize the possibility that insecticides might contaminate the environment. In addition, foragers will discover insecticidal granules quickly before degradation of the active ingredient or chemical/physical changes of granule matrices occur, thus efficacy of the granules will be maximized. Ant control programs can also be designed to be more species-specific by attracting particular target species or groups of related species, while having little or no effect on other non-target ants or other invertebrates.

A system and method, which improves current insecticide application practices is disclosed, which improves (1) efficacy and (2) target specificity (pheromones are species-specific). Ultimately, the system and method disclosed can also help reduce the overall amount of insecticide applied in the environment and therefore reduce the unintended contamination of urban waterways with insecticides.

The invention is not limited, however, to the embodiments and variations described above and illustrated in the drawing figures. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A method of improving efficacy of insecticide sprays, comprising:
    mixing a concentration of (Z)-9-nexadecenal and a solvent with a non-repellant insecticide spray that includes fipronil, wherein an amount of the (Z)-9-hexadecenal comprises approximately 1 mg of the (Z)-9-hexadecenal per approximately 500 ml of a final mixture that includes the concentration of the (Z)-9-hexadecenal and the solvent with the non-repellant insecticide spray that includes fipronil; and
    applying the final mixture of the concentration of the (Z)-9-hexadecenal and the solvent with the non-repellant insecticide spray that includes fipronil to attract foraging Argentine ants from nearby trails and nests to a treatment area.

2. A method of improving efficacy of insecticide sprays, comprising:
    mixing a concentration of (Z)-9-hexadecenal and a solvent with a non-repellant insecticide spray that includes fipronil to form a final mixture, the (Z)-9-hexadecenal being 0.002 milligrams per milliliter of the final mixture; and
    applying the final mixture of the (Z)-9-hexadecenal and the solvent with the non-repellant insecticide spray that includes fipronil to attract foraging Argentine ants from nearby trails and nests to a treatment area.

3. The method of claim 1, comprising:
    adding the concentration of the (Z)-9-hexadecenal and the solvent to the insecticide spray that includes fipronil immediately before application of the final mixture to the treatment area.

4. The method of claim 1, comprising:
    spraying the final mixture of the concentration of the (Z)-9-hexadecenal and the solvent with the non-repellant insecticide spray that includes fipronil to the treatment area, which attracts the foraging Argentine ants from nearby trails and nests, thus maximizing a number of exposed ants.

5. The method of claim 1, comprising:
    using the final mixture of the concentration of the (Z)-9-hexadecenal and the solvent with the non-repellant insecticide spray that includes fipronil to attract the foraging Argentine ants to a mixture deposit containerized in a station.

6. The method of claim 1, wherein the non-repellant insecticide spray that includes fipronil is an insecticidal foam.

7. The method of claim 1, comprising:
    using the final mixture of the concentration of the (Z)-9-hexadecenal and the solvent with the non-repellant insecticide spray that includes fipronil to attract the foraging Argentine ants, and while having little or no effect on other non-target ants or other invertebrates.

8. A method of improving efficacy of insecticide sprays, comprising:
    mixing (Z)-9-hexadecenal, ethyl alcohol and water with a non-repellant insecticide spray that includes fipronil, wherein the (Z)-9-hexadecenal comprises 0.002 milligrams per milliliter of a final mixture of (Z)-9-hexadecenal, ethyl alcohol and water with a non-repellant insecticide spray that includes fipronil; and
    spraying the final mixture of the (Z)-9-hexadecenal, ethyl alcohol and water with a non-repellant insecticide spray that includes fipronil on a treatment area immediately after the mixing of the (Z)-9-hexadecenal, ethyl alcohol and water with a non-repellant insecticide spray that includes fipronil.

9. The method of claim 1, comprising:
    spraying the final mixture of the concentration of the (Z)-9-hexadecenal and the solvent with the non-repellant insecticide spray that includes fipronil on an entrance to one or more nests of the foraging Argentine ants.

10. The method of claim 1, wherein the solvent include ethyl alcohol and water.

11. The method of claim 1, further comprising:
    placing the final mixture of the (Z)-9-hexadecenal with the solvent and the non-repellant insecticide spray that includes fipronil in a bait station.

12. The method of claim 1, further comprising:
    using the final mixture of the (Z)-9-hexadecenal with the solvent and the non-repellant insecticide spray that includes fipronil with insecticidal granules.

13. A method of improving efficacy of insecticide sprays, comprising:
    mixing a concentration of (Z)-9-hexadecenal and a non-repellant insecticide spray, the (Z)-9-hexadecenal comprising 0.002 milligrams per milliliter of a final mixture that includes the concentration of the (Z)-9-hexadecenal, a solvent, and the non-repellant insecticide spray, and wherein the non-repellant insecticide spray includes 0.01% fipronil.

14. The method of claim 1, wherein the non-repellant insecticide spray that includes fipronil is 0.01% fipronil.

* * * * *